United States Patent
Seo et al.

(10) Patent No.: US 12,461,499 B2
(45) Date of Patent: Nov. 4, 2025

(54) PROGRAMMABLE LOGIC CONTROLLER CONTROL DEVICE AND METHOD THEREOF

(71) Applicant: Samsung Display Co., Ltd., Yongin-si (KR)

(72) Inventors: Yunmin Seo, Hwaseong-si (KR); Daegeon Kim, Cheonan-si (KR); Jaegeun Cho, Asan-si (KR); Sungbog Ku, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 416 days.

(21) Appl. No.: 17/994,769

(22) Filed: Nov. 28, 2022

(65) Prior Publication Data

US 2023/0185266 A1 Jun. 15, 2023

(30) Foreign Application Priority Data

Dec. 10, 2021 (KR) ......................... 10-2021-0176233

(51) Int. Cl.
*G05B 19/05* (2006.01)
(52) U.S. Cl.
CPC ...... *G05B 19/05* (2013.01); *G05B 2219/1204* (2013.01)
(58) Field of Classification Search
CPC .................. G05B 19/05; G05N 2219/1204
USPC ........................................................ 700/28
See application file for complete search history.

(56) References Cited

U.S. PATENT DOCUMENTS

| 7,440,932 | B2 | 10/2008 | Gartland et al. |
| 10,401,836 | B2 | 9/2019 | Jin et al. |
| 11,703,827 | B2 * | 7/2023 | Miller .................... G06Q 10/20 700/28 |
| 11,726,453 | B2 * | 8/2023 | Kamiya ............... G05B 19/056 700/28 |
| 11,726,454 | B2 * | 8/2023 | Takizawa ........... G05B 19/4183 700/28 |
| 2016/0370783 | A1 * | 12/2016 | Yoon ..................... G05B 19/052 |
| 2018/0314225 | A1 * | 11/2018 | Bisse ..................... G05B 19/05 |
| 2019/0103763 | A1 * | 4/2019 | Colclazier ................. H02J 3/04 |
| 2019/0104633 | A1 * | 4/2019 | Ross ....................... G05B 19/05 |
| 2019/0176332 | A1 * | 6/2019 | Galloway ............... B25J 9/1674 |

FOREIGN PATENT DOCUMENTS

| JP | 2017174431 A | 9/2017 |
| KR | 100745529 B1 | 8/2007 |
| KR | 1020120010435 A | 2/2012 |
| KR | 1020200065475 A | 6/2020 |

* cited by examiner

*Primary Examiner* — Md Azad
(74) *Attorney, Agent, or Firm* — CANTOR COLBURN LLP

(57) ABSTRACT

A programmable logic controller (PLC) control device includes: a plurality of main blocks, each of which controls a corresponding one of a plurality of upper modules in a facility; a plurality of sub-blocks included in each of the plurality of main blocks and each of which controls a corresponding one of a plurality of sub-modules; and a process block included in each of the plurality of main blocks and which manages operation steps of a corresponding one of the plurality of upper modules.

19 Claims, 7 Drawing Sheets

PROGRAMMABLE LOGIC CONTROLLER CONTROL DEVICE AND METHOD THEREOF

This application claims priority to Korean Patent Application No. 10-2021-0176233 filed on Dec. 10, 2021, and all the benefits accruing therefrom under 35 U.S.C. § 119, the content of which in its entirety is herein incorporated by reference.

BACKGROUND

Embodiments of the present disclosure described herein relate to a PLC control device and method, and more particularly, relate to a PLC control device and method for an automated facility using an object-oriented method.

As the corporate environment has become globalized, many companies are actively introducing automated manufacturing systems as part of strengthening competitiveness. Accordingly, as the level of automation is advanced, logistics flows or process control methods at production sites are becoming more and more complex. Currently, a Programmable Logic Controller ("PLC") is mostly adopted as a main controller in factory automation.

The PLC is a device that uses programmable memory to perform functions such as logic, sequencing, timing, counting, and operation through digital or analog input/output modules and controls various types of machines or processors, and is widely used in many industries for factory automation.

SUMMARY

Embodiments of the present disclosure provide a PLC control device and method for improving the working efficiency of an automated facility.

According to an embodiment of the present disclosure, a programmable logic controller (PLC) control device includes: a plurality of main blocks, each of which controls a corresponding one of a plurality of upper modules in a facility; a plurality of sub-blocks included in each of the plurality of main blocks and each of which controls a corresponding one of a plurality of sub-modules; and a process block included in each of the plurality of main blocks and which manages operation steps of a corresponding one of the plurality of upper modules.

According to an embodiment, the plurality of main blocks may be independent of one another and may include a first main block and a second main block, which are sequentially controlled.

According to an embodiment, the plurality of upper modules may include a first upper module and a second upper module, and the first main block may control the first upper module and the second main block may control the second upper module.

According to an embodiment, the process block may transfer information between the plurality of sub-blocks and a corresponding one of the plurality of main blocks.

According to an embodiment, the process block may receive status information of the sub-modules from the plurality of sub-blocks and may transmit the status information to the corresponding main block, and may receive a driving signal from the corresponding main block and may transmit the driving signal to the plurality of sub-blocks.

According to an embodiment, the plurality of sub-blocks may issue a driving command to a corresponding sub-module based on the driving signal received from the process block.

According to an embodiment, each of the plurality of sub-blocks may include an interlock management unit, which checks an operating condition of the sub-module, a first state management unit, which manages a status of the sub-module, and a first driving command unit, which issues a drive command to the sub-module.

According to an embodiment, each of the plurality of sub-blocks may include at least one driving block, and the at least one driving block may control a driving unit of a corresponding sub-block.

According to an embodiment, the at least one driving block may include a second driving command unit, which issues a driving command to the driving unit of the sub-block, and a second state management unit, which manages a status of the driving unit.

According to an embodiment, each of the plurality of sub-blocks may include a first variable management structure, which stores status information of the at least one driving block, and the process block may include a second variable management structure, which stores driving information of the at least one driving block.

According to an embodiment of the present disclosure, a PLC control method includes: generating a first main block from among a plurality of main blocks, each of which including a plurality of sub-blocks and a process block; generating first sub-blocks corresponding to the first main block; and transferring information between the first sub-blocks and the first main block, and generating a first process block for managing operation steps of the first main block.

According to an embodiment, the first main block may control a corresponding first upper module among a plurality of upper modules in a facility, and each of the first sub-blocks may control a first sub-module corresponding to the first upper module among a plurality of sub-modules.

According to an embodiment, the method may further include generating a first driving block, which allows each of the first sub-blocks to issue a driving command to the corresponding first sub-module.

According to an embodiment, the generating of the first process block may include receiving, by the first process block, status information of the first sub-module from the first sub-blocks and transmitting the status information to the first main block, and receiving, by the first process block, a driving signal from the first main block and transferring the driving signal to the first sub-blocks.

According to an embodiment, the generating of the first driving block may further include issuing the driving command to the first sub-module based on the driving signal received from the first process block by the first sub-blocks.

According to an embodiment, the generating of the first driving block may include managing a status of the driving unit, by the first driving block, and issuing the driving command directly to the driving unit.

According to an embodiment, the generating of the first sub-blocks may include an interlock management operation including managing, by the first sub-blocks, a status of the first sub-module and checking an operating condition of the first sub-module when the driving signal is received from the first process block.

According to an embodiment, the generating of the first sub-blocks may include storing status information of the first sub-module, by the first sub-blocks, in a first variable management structure.

According to an embodiment, the generating of the first process block may include storing driving information of the first sub-module, by the first process block, in a second variable management structure and sharing the driving information with the first variable management structure.

According to an embodiment, the plurality of main blocks may further include a second main block independent of the first main block and which controls a second upper module, the first main block and the second main block may be defined as global types, and the first main block and the second main block may share the status information and the driving information of the driving block with each other through the first variable management structure and the second variable management structure, respectively.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
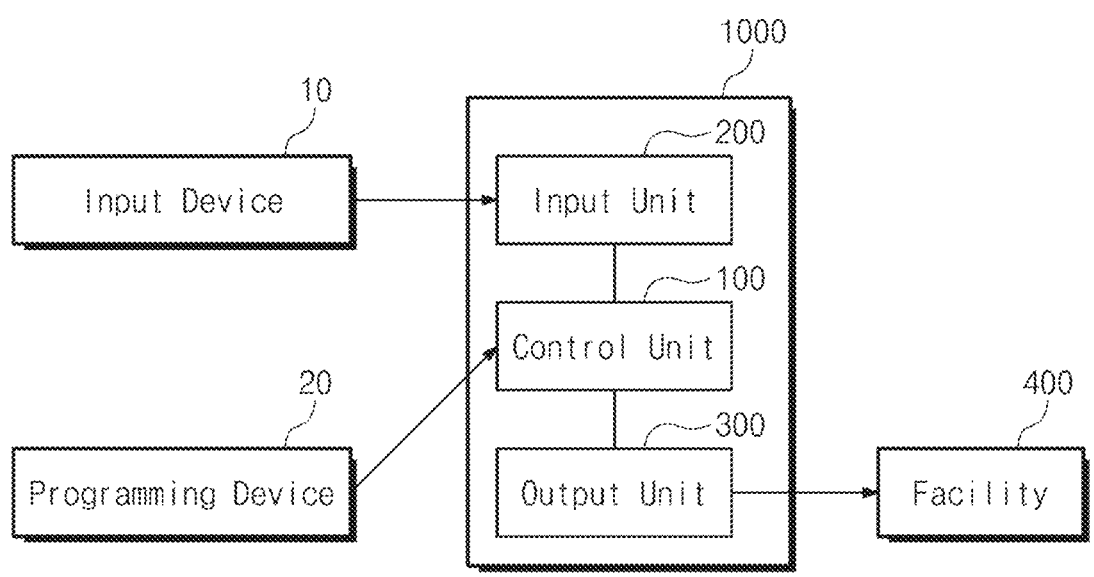
FIG. 1 is a diagram illustrating a PLC control system, according to an embodiment of the present disclosure.

In the specification, when one component (or area, layer, part, or the like) is referred to as being "on", "connected to", or "coupled to" another component, it should be understood that the former may be directly on, connected to, or coupled to the latter, and also may be on, connected to, or coupled to the latter via a third intervening component.

Like reference numerals refer to like components. Also, in drawings, the thickness, ratio, and dimension of components are exaggerated for effectiveness of description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes one or more combinations of the associated listed items.

The terms "first", "second", etc. are used to describe various components, but the components are not limited by the terms. The terms are used only to differentiate one component from another component. For example, a first component may be named as a second component, and vice versa, without departing from the spirit or scope of the present disclosure. A singular form, unless otherwise stated, includes a plural form.

Also, the terms "under", "beneath", "on", "above" are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless defined otherwise, all terms (including technical and scientific terms) used herein have the same meaning as commonly understood by one of ordinary skill in the art to which this disclosure belongs. In addition, terms such as terms defined in commonly used dictionaries should be interpreted as having a meaning consistent with the meaning in the context of the related technology, and should not be interpreted as an ideal or excessively formal meaning unless explicitly defined in the present disclosure.

Hereinafter, embodiments of the present disclosure will be described with reference to accompanying drawings.

FIG. 1 is a diagram illustrating a PLC (Programmable Logic Controller) control system according to an embodiment of the present disclosure.

Referring to FIG. 1, a PLC control system may include an input device 10, a programming device 20, a PLC control device 1000, and a facility 400.

The PLC control system may include the programmed PLC control device 1000 for controlling the automated facility 400. The PLC control system may effectively control equipment in an industrial facility at once.

The input device 10 may include various conditions and status information regarding a manufacturing process, packaging, and transportation of the equipment in the facility 400. The input device 10 may provide the corresponding information to the PLC control device 1000. In an embodiment, for example, the input device 10 may include various sensors such as a position sensor, a pressure sensor, a temperature sensor, and an image sensor.

The PLC control device 1000 transmits an output signal for driving the equipment in the facility to various control modules in the facility in response to input information provided from the input device 10. The PLC control device 1000 may control a series of processes that allow the equipment in the facility 400 to perform predetermined operations in a predetermined order and time. The PLC control device 1000 includes control logic for controlling the facility 400. The PLC control device 1000 may be referred to as 'PLC control logic'.

The facility 400 may include various equipment. The various equipment may include various control modules for driving, respectively. The control modules may include an upper module and a sub-module. The details will be described with reference to FIG. 2.

The programming device 20 may be connected to the PLC control device 1000 to transmit a control program for a control unit of the PLC control device 1000.

In FIG. 1, the PLC control device 1000 may include a control unit 100, an input unit 200, and an output unit 300. The PLC control device 1000 may further include a memory (not illustrated).

The input unit 200 may transfer input information received from the input device 10 such as a sensor or a switch to the control unit 100.

The control unit 100 may include a processor or a CPU that analyzes the input information received from the input unit 200. The control unit 100 may provide the analyzed input information to the facility 400 through the output unit 300.

The output unit 300 may provide a command provided from the control unit 100 to the control modules of the facility 400.

Figure 2:
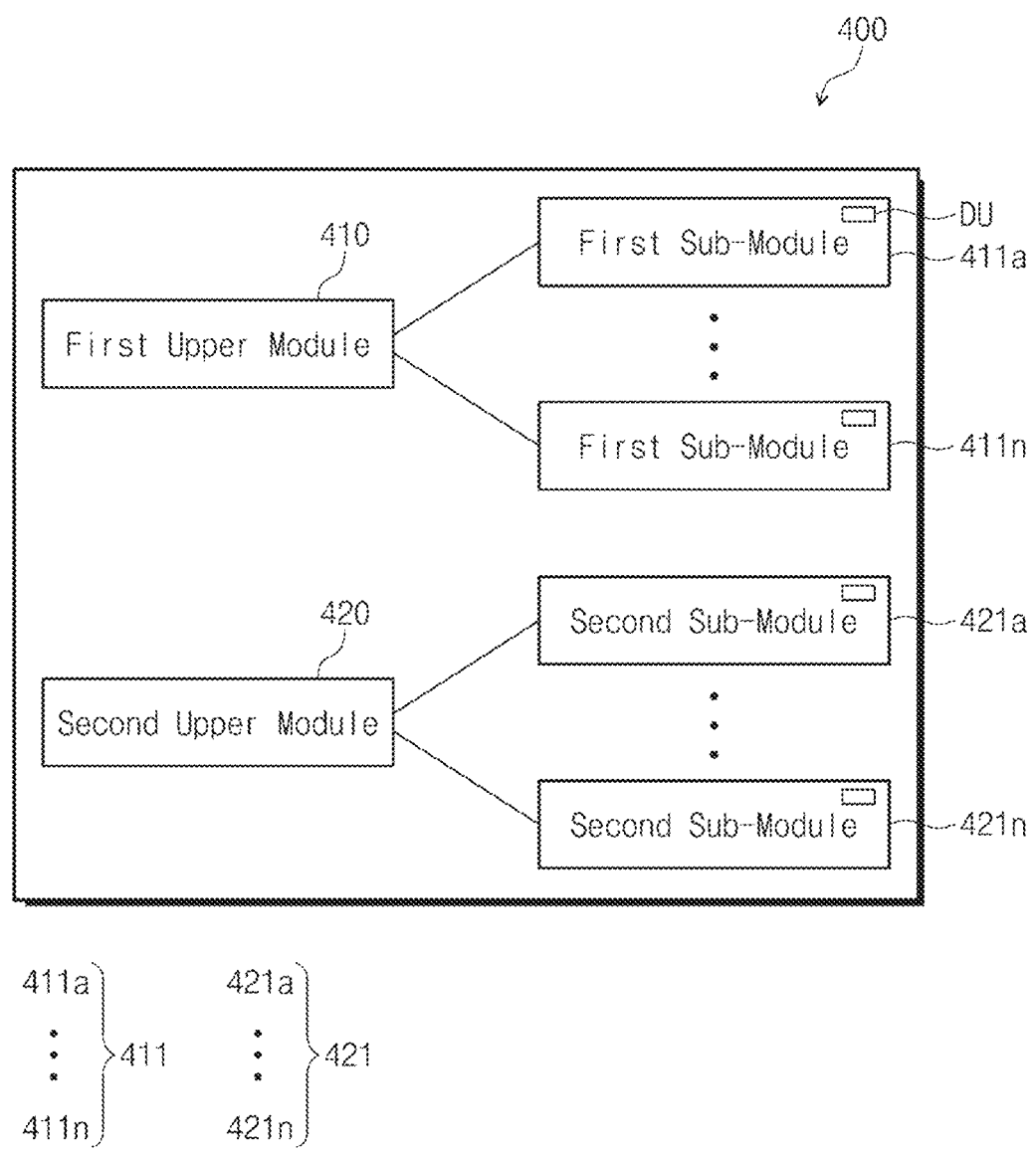
FIG. 2 is a block diagram illustrating a facility, according to an embodiment of the present disclosure.

FIG. 2 is a block diagram illustrating a facility, according to an embodiment of the present disclosure.

Referring to FIG. 2, the facility 400 may include upper modules 410 and 420 and sub-modules 411 and 421. The upper modules 410 and 420 and the sub-modules 411 and 421 may each be provided as a plurality. The plurality of sub-modules 411 and 421 may include a driving unit DU.

The upper modules 410 and 420 may correspond to core modules constituting the equipment in the facility 400. In an embodiment, for example, the upper module 410 may correspond to a stage, a shuttle, or a robot. The equipment may include a plurality of upper modules 410 and 420. The upper modules 410 and 420 may include the plurality of sub-modules 411 and 421.

The sub-modules 411 and 421 may perform operations of the upper modules 410 and 420 as a plurality. In an embodiment, for example, the sub-modules 411 and 421 may include a cylinder, a vacuum device, or a servo motor.

In an embodiment, the upper modules 410 and 420 may include a first upper module 410 and a second upper module 420. The sub-modules 411 and 421 may include a first sub-module 411 and a second sub-module 421. The first upper module 410 may include a plurality of first sub-modules 411a to 411n. The second upper module 420 may include a plurality of second sub-modules 421a and 421b. In an embodiment, for example, the first upper module 410 may be a robot. The first sub-module 411 may be a motor.

Figure 3:
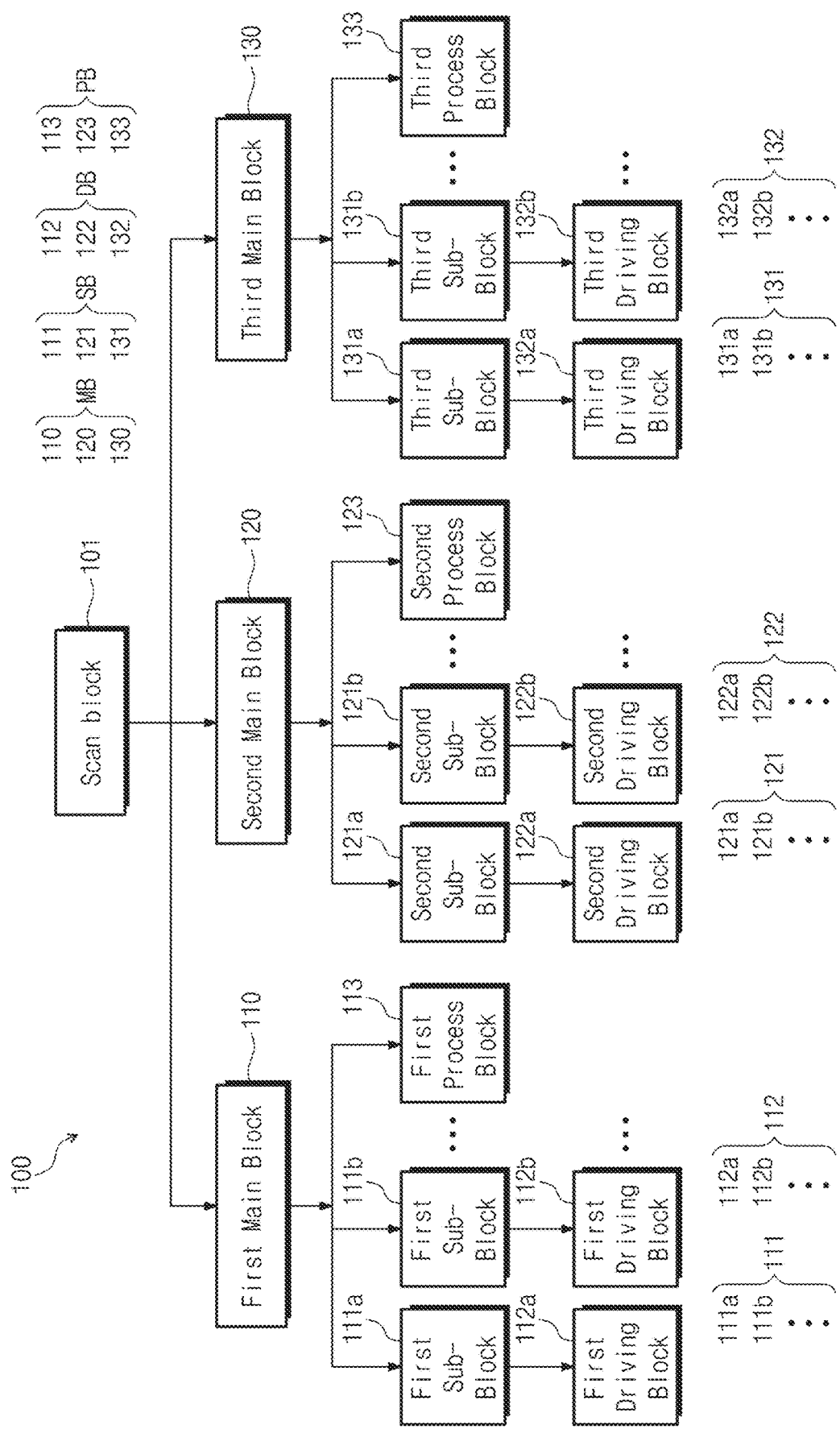
FIG. 3 is a block diagram illustrating a PLC control device, according to an embodiment of the present disclosure.

FIG. 3 is a block diagram illustrating a PLC control device, according to an embodiment of the present disclosure. FIG. 3 is a block diagram illustrating the control unit 100 of the PLC control device 1000.

The PLC control device 1000 may use an object-oriented method. The PLC control device 1000 may include a scan block 101, a main block MB, a process block PB, a sub-block SB, and a driving block DB. The main block MB, the process block PB, the sub-block SB, and the driving block DB may correspond to objects that perform different functions in the PLC control device 1000, respectively, according to an embodiment.

The scan block 101 may call the main block MB to call the sub-block SB and the process block PB, which are sub-functional blocks of the main block MB. That is, the main block MB is generated depending on scanning of the scan block 101, and at the same time, the sub-block SB and the process block PB corresponding to the main block MB are generated, and the operation of the module may be controlled through the driving block DB.

The main block MB may manage data of the upper modules 410 and 420 (refer to FIG. 2) and may control operations thereof. The sub-block SB may manage data of the sub-modules 411 and 421 (refer to FIG. 2) and may control operations thereof. The sub-block SB may provide the status of the sub-modules 411 and 421 to the process block PB.

The process block PB may receive status information of the sub-modules 411 and 421 from the sub-block SB and may manage the operation steps of the upper modules 410 and 420. The process block PB may provide a driving command of the sub-modules 411 and 421 generated during the automated operation of the upper modules 410 and 420 to the sub-block SB.

The sub-block SB may transmit a command to an interlock management unit 12 (refer to FIG. 4B) and the driving block DB with respect to the driving command received from the process block PB. The driving command may not be transmitted to the driving block DB in an on-state of an interlock, and the driving command may be transmitted to the driving block DB in an off-state of the interlock.

The driving block DB may control the sub-modules 411 and 421 through the driving unit DU (refer to FIG. 2). That is, the driving block DB may manage the driving data of the sub-modules 411 and 421 and may directly control the sub-modules 411 and 421.

The PLC control device 1000 may generate or call the main block MB of an upper module unit that performs the core operation of the facility 400 to generate or call the process block PB that controls the operation steps of the upper modules 410 and 420 and the sub-block SB of a sub-module unit that performs a sub-operation of the upper modules 410 and 420. The PLC control device 1000 may have a tree structure that generates the driving block DB that controls the driving unit DU of the sub-modules 411 and 421 controlled in the sub-block SB generated in the main block MB, in an object-oriented method.

A plurality of main blocks MB may correspond to the plurality of upper modules 410 and 420, respectively. The plurality of main blocks MB may control a corresponding one of the plurality of upper modules 410 and 420 in the facility 400, respectively (refer to FIG. 1). In an embodiment, for example, the main blocks MB may include a first main block 110, a second main block 120, and a third main block 130. The first main block 110 may perform data management and control of the first upper module 410. The second main block 120 may control the second upper module 420.

A plurality of sub-blocks SB may correspond to the plurality of sub-modules 411 and 421. The plurality of sub-blocks SB may be included in each of the plurality of main blocks MB. Each of the plurality of sub-blocks SB may control a corresponding one of the plurality of sub-modules. The plurality of sub-blocks SB may include a plurality of first sub-blocks 111, a plurality of second sub-blocks 121, and a plurality of third sub-blocks 131. The plurality of first sub-blocks 111 may be included in the first main block 110.

The process block PB may be included in each of the plurality of main blocks MB. The process block PB may control operation steps of the main block MB and may transfer information between the sub-block SB and the corresponding main block MB. A first process block 113 may be included in the first main block 110. A second process block 123 may be included in the second main block 120, and a third process block 133 may be included in the third main block 130.

A plurality of driving blocks DB may correspond to the plurality of sub-blocks SB. One sub-block SB may include at least one driving block DB. The driving block DB may directly transmit a driving signal to the sub-module through the driving unit DU of the sub-module. Each of the first sub-blocks 111 may include a first driving block 112. Each of the second sub-blocks 121 may include a second driving block 122. Each of the third sub-blocks 131 may include a third driving block 132.

The first, second, and third main blocks 110, 120, and 130 may be controlled independently of each other. The first, second, and third main blocks 110, 120, and 130 may be sequentially controlled. That is, after the first main block 110 is generated and the first upper module 410 is driven by the first sub-block 111, the first process block 113, and the first driving block 112, the second main block 120 may be generated, and the second upper module 420 may be driven.

Figure 4A:
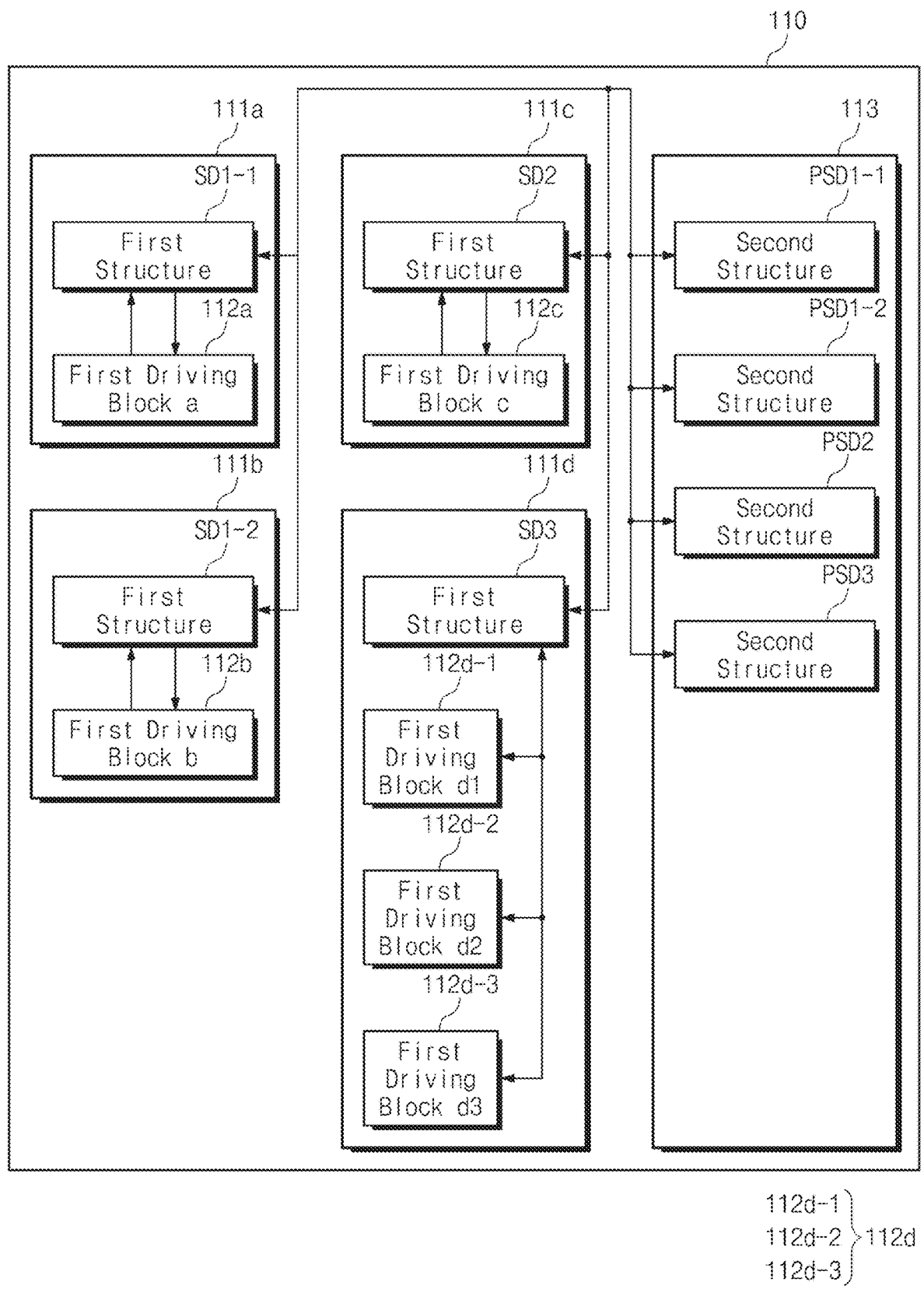
FIG. 4A is a diagram illustrating a first main block, according to an embodiment of the present disclosure.
Figure 4B:
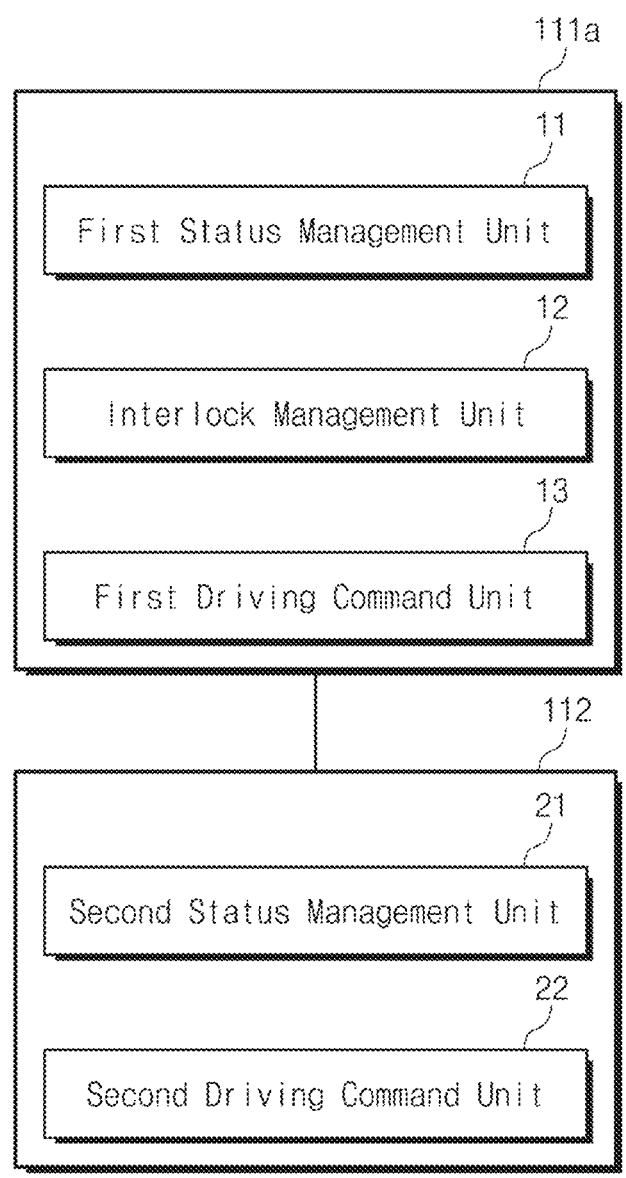
FIG. 4B is a diagram illustrating a first sub-block, according to an embodiment of the present disclosure.

FIG. 4A is a diagram illustrating a first main block, according to an embodiment of the present disclosure. FIG. 4B is a diagram illustrating a first sub-block, according to an embodiment of the present disclosure.

Referring to FIG. 4A, the first main block 110 may include a plurality of first sub-blocks 111a, 111b, 111c, and 111d, and the one first process block 113.

The plurality of first sub-blocks 111a, 111b, 111c, and 111d may include first variable management structures SD-1, SD-2, SD2, and SD3 (hereinafter, first structures), respectively, and each of the plurality of first sub-blocks 111a, 111b, 111c, and 111d may include at least one first driving blocks 112a, 112b, 112c, and 112d.

The first process block 113 may include a plurality of second variable management structures PSD1-1, PSD1-2, PSD2, and PSD3 (hereinafter, second structures).

The first structures SD-1, SD-2, SD2, and SD3 and the second structures PSD1-1, PSD1-2, PSD2, and PSD3 may store data in an open state. Accordingly, data may be shared among the plurality of first structures SD-1, SD-2, SD2, and SD3 and the plurality of second structures PSD1-1, PSD1-2, PSD2, and PSD3 even though they do not correspond to each other. The first structures SD-1, SD-2, SD2, and SD3 and the second structures PSD1-1, PSD1-2, PSD2, PSD3 may store various variables of the first sub-module 411 (refer to FIG. 2). In an embodiment, for example, the first structures SD-1, SD-2, SD2, and SD3 and the second structures PSD1-1, PSD1-2, PSD2, and PSD3 may store variables related to the status and variables related to the operation of the first sub-module 411.

The first sub-blocks 111a, 111b, 111c, and 111d may receive a driving command from the first process block 113 through the first structures SD-1, SD-2, SD2, and SD3. The first process block 113 may provide a driving command stored in the second structures PSD1-1, PSD1-2, PSD2, and PSD3 and information of the first main block 110 to the first structures SD-1, SD-2, SD2, SD3 of the first sub-blocks 111a, 111b, 111c, and 111d.

The first sub-blocks 111a, 111b, 111c, and 111d may store status information of the first sub-module 411 in the first structures SD-1, SD-2, SD2, and SD3. The first sub-blocks 111a, 111b, 111c, and 111d may store the status information of the driving unit DU (refer to FIG. 2) of the first sub-module 411 and the driving command from the first process block 113 in the first structures SD-1, SD-2, SD2, and SD3.

The first driving block 112 may receive the driving command from the first sub-block 111 to provide a driving signal to the driving unit DU of the first sub-module 411. In more detail, the first driving block 112 may receive the driving command from the first structures SD-1, SD-2, SD2, and SD3. The first driving block 112 may provide the status information of the first sub-module 411 to the first structures SD-1, SD-2, SD2, and SD3. The first structures SD-1, SD-2, SD2, and SD3 may receive the status information of the first sub-module 411 and may provide the status information to the second structures PSD1-1, PSD1-2, PSD2, and PSD3 of the first process block 113. The first process block 113 may manage operation steps of the first main block 110, and may provide the status information of the first sub-module 411 to the first main block 110.

In an embodiment, the plurality of first sub-blocks 111a, 111b, 111c, and 111d may include the first driving blocks 112a, 112b, 112c, and 112d, respectively. In detail, any one the first sub-block 111d may include a plurality of first driving blocks 112d-1, 112d-1, and 112d-3. In an embodiment, for example, any one of the first sub-blocks 111d including the plurality of first driving blocks 112d-1, 112d-1, and 112d-3 may control the driving of a servo motor. In this case, the first driving blocks 112d-1, 112d-1, and 112d-3 may serve to control the servo motor in the x, y, and z-axis directions, respectively.

Referring to FIG. 4B, the first sub-block 111 may include a first state management unit 11, an interlock management unit 12, and a driving command unit 13. The first driving block 112 may include a second state management unit 21 and a second driving command unit 22.

The first state management unit 11 may manage the status of the sub-module. The first state management unit 11 may manage the status of the sub-module based on the status information of the sub-module received from the first driving block and may provide the status information to the first process block.

The interlock management unit 12 may check the operating condition of the sub-module. The interlock management unit may check whether the sub-module is in a driving condition. In an embodiment, for example, when the operating condition of the sub-module is not satisfied, the interlock may be in an on-state, and when it is satisfied, the interlock may correspond to an off-state. The interlock management unit 12 may determine whether the operation condition is satisfied by determining the operation condition.

The first driving command unit 13 may issue a driving command to a sub-module. In detail, the first driving command unit 13 may not directly issue a driving command to the driving unit of the sub-module, but may transfer the driving command to a driving block.

The second state management unit 21 may manage the status of a driving unit of the sub-module. The second state management unit 21 may transfer the status of the driving unit DU to a sub-block.

The second driving command unit 22 may directly issue a driving command to the driving unit DU of a sub-module. The second driving command unit 22 may issue the driving command to the driving unit when the driving command from a sub-block is received.

Figure 5:
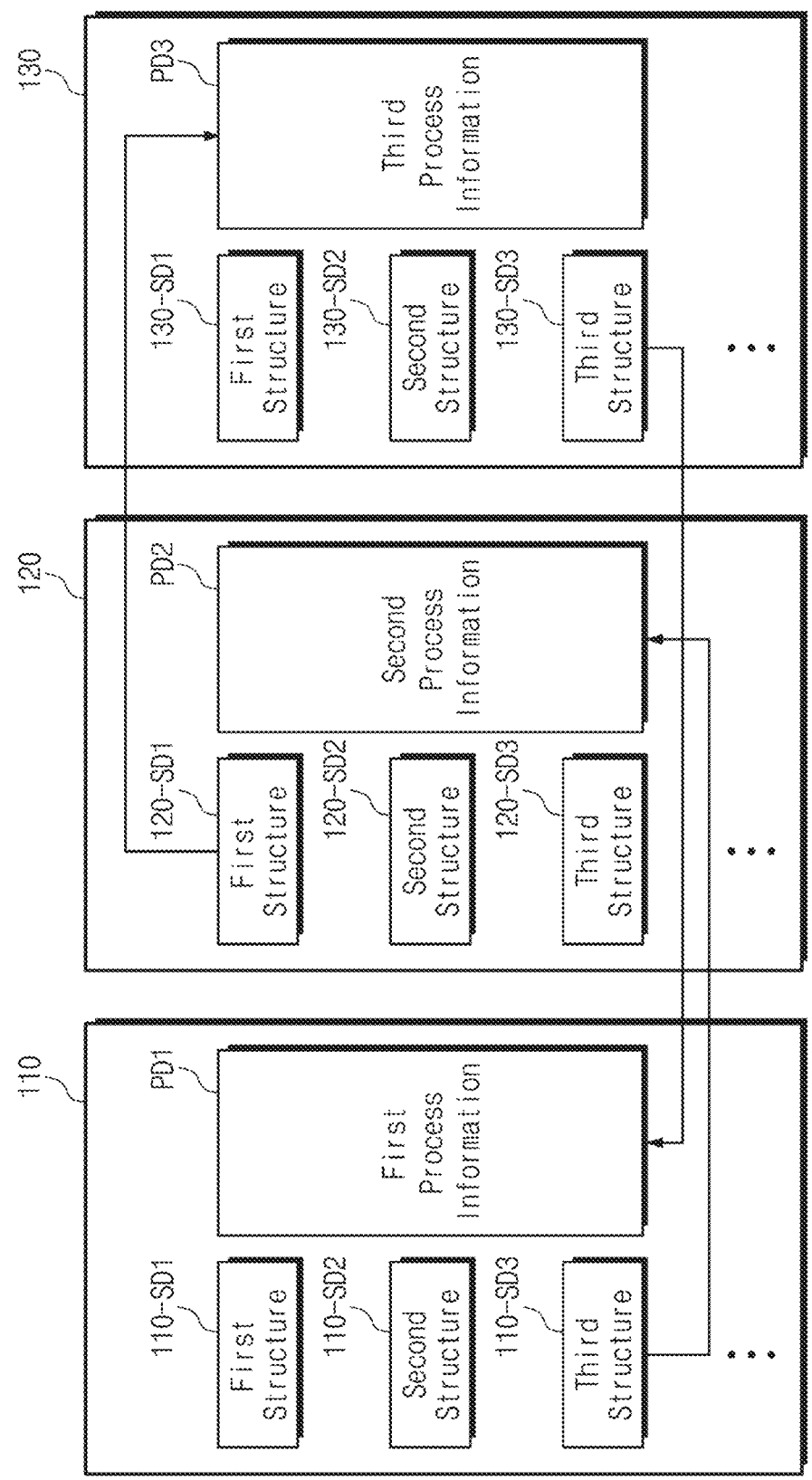
FIG. 5 is a diagram illustrating main blocks, according to an embodiment of the present disclosure.

FIG. 5 is a diagram illustrating main blocks, according to an embodiment of the present disclosure.

In one embodiment, the information about the operation steps among the first main block 110, the second main block 120, and the third main block 130 and the information about the sub-blocks may be shared through the structures that are managed in a public state. The main block MB may be designed as a global type including a plurality of structures in a public state. The first main block 110, the second main block 120, and the third main block 130 that have the global type may share information with each other.

In an embodiment, the first main block 110 may include first process information PD1, the second main block 120 may include second process information PD2, and the third main block 130 may include third process information PD3. The process information may include operation step information of an upper module, status information of a sub-module, and operation information.

The first main block 110 may include a first structure 110-SD1, a second structure 110-SD2, and a third structure 110-SD3. The second main block 120 may include a first structure 120-SD1, a second structure 120-SD2, and a third structure 120-SD3. The third main block 130 may include a first structure 130-SD1, a second structure 130-SD2, and a third structure 130-SD3. Each of the structures may be managed in a public state. Each of the first main block 110, the second main block 120, and the third main block 130 may store and manage information in a plurality of structures. In an embodiment, for example, the first structures 110-SD1, 120-SD1, and 130-SD1 may include status information of one first sub-module among a plurality of first sub-modules. The second structures 110-SD2, 120-SD2, and 130-SD2 may include status information of the other first sub-module among the first sub-modules. The third structures 110-SD3, 120-SD3, and 130-SD3 include information on operation steps of the first main block 110, the second main block 120, and the third main block 130, respectively.

Public structures may be accessible from other main blocks. Accordingly, information may be easily shared among the first main block 110, the second main block 120, and the third main block 130.

Figure 6:
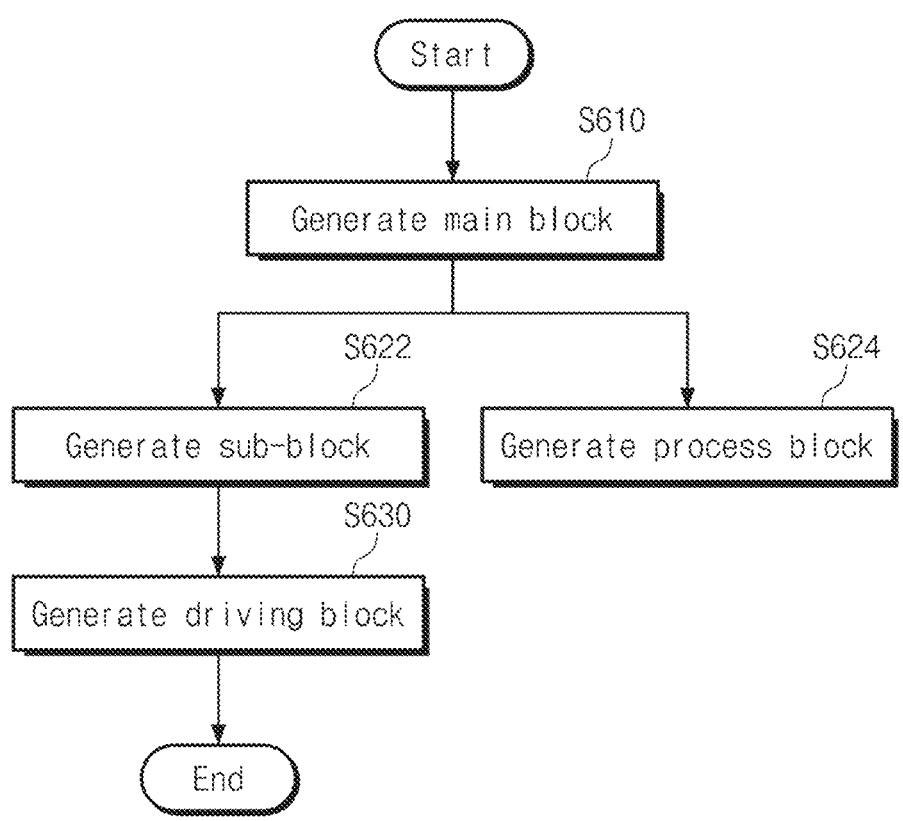
FIG. 6 is a flowchart illustrating a PLC control method, according to an embodiment of the present disclosure.

FIG. 6 is a flowchart illustrating a PLC control method, according to an embodiment of the present disclosure. It will be described below with reference to FIGS. 3 and 4A. Additional description will be omitted to avoid redundancy.

In FIG. 6, the PLC control method may include generating a main block (operation S610). In an embodiment, generating of the main block may include generating the first main block 110 among the plurality of main blocks MB respectively including the plurality of sub-blocks SB and the process block PB.

The PLC control method may include generating a sub-block (operation S622) and generating a process block (operation S624) subsequent to operation of generating the main block. The sub-block SB and the process block PB may be generated depending on the generation of the main block MB. In an embodiment, for example, the plurality of first sub-blocks 111 and the first process block 113 corresponding to the first main block 110 may be generated depending on the generation of the first main block 110.

In an embodiment, the generating of the first sub-block (operation S622) may include managing status information and interlock information of the first sub-module. Each of the first sub-blocks may store and manage the status information about state variables of the first sub-block and driving information about driving variables through a first variable management structure. Also, generating of the first sub-block (operation S622) may include transferring the status information and the interlock information of the first sub-module to the first process block PB.

In one embodiment, the generating of the first process block (operation S624) may include transferring the status information of the first sub-module to the first main block MB and receiving a driving command from the first main block MB to transfer the driving command to the first sub-blocks SB. The first process block 113 may store and manage the status information and driving information of the first sub-block received from the first sub-blocks 111 in the second variable management structure.

The PLC control method may include generating a driving block (operation S630). The generating of the driving block may include generating the plurality of first driving blocks 112a and 112b corresponding to the plurality of first sub-blocks 111a and 111b, respectively, corresponding to the first main block MB. The plurality of first driving blocks 112a and 112b may receive the driving commands from the corresponding first sub-blocks 111a and 111b to directly issue the driving commands to the driving units of first sub-modules, respectively.

The PLC control device and method according to an embodiment of the present disclosure uses an object-oriented method to increase the driving efficiency of an automation facility with many repetitive functions, and to facilitate integration with other PLC control devices. In addition, there is an advantage that black boxing of core objects (blocks) is possible.

According to an embodiment of the present disclosure, a PLC control device and method according to an embodiment of the present disclosure may improve the work efficiency of an automated facility by using the same hardware-first object-oriented method as the configuration of an actual facility.

According to an embodiment of the present disclosure, the PLC control device and method according to an embodiment of the present disclosure uses an object-oriented method to allocate only minimum memory for each object to prevent memory leaks, to prevent erroneous access to data, to enable encryption for each object, and to be applied in common to automation facilities to unify the platform between facilities.

As used in connection with various embodiments of the disclosure, the term "module", "block" or "unit" may include a unit implemented in hardware, software, and/or firmware, and may be interchangeably used with other terms, for example, "logic," "logic block," "part," or "circuitry". A module/block/unit may be a single integral component, and/or a minimum unit or part thereof, adapted to perform one or more functions. For example, according to an embodiment, the module may be implemented in a form of an application-specific integrated circuit (ASIC).

As described above, embodiments are disclosed in drawings and specifications. Specific terms are used herein, but are only used for the purpose of describing the present disclosure, and are not used to limit the meaning or the scope of the present disclosure described in claims. Therefore, it may be understood that various modifications and other equivalent embodiments are possible from this point one of ordinary skill in the art. The technical protection scope of the present disclosure will be defined by the technical spirit of the appended claims.

What is claimed is:

1. A programmable logic controller (PLC) control device comprising:
　a plurality of main blocks, each of which controls a corresponding one of a plurality of upper modules in an automated facility;
　a plurality of sub-blocks included in each of the plurality of main blocks and, each of which controls a corresponding one of a plurality of sub-modules, wherein each of the plurality of sub-blocks includes:
　an interlock management unit, which checks an operating condition of a sub-module;
　a first state management unit, which manages a status of the sub-module; and
　a first driving command unit, which selectively issues a drive command to the sub-module based on a state of the interlock management unit; and
　a process block included in each of the plurality of main blocks and which manages operation steps of a corresponding one of the plurality of upper modules,
　wherein the PLC control device controls the automated facility by controlling equipment in the automated facility, wherein each of the plurality of main blocks is associated with a separate piece of equipment in the automated facility controlled by the PLC control device.

2. The PLC control device of claim 1, wherein the plurality of main blocks are independent of one another and include a first main block and a second main block, which are sequentially controlled.

3. The PLC control device of claim 2, wherein the plurality of upper modules includes a first upper module and a second upper module, and
wherein the first main block controls the first upper module and the second main block controls the second upper module.

4. The PLC control device of claim 1, wherein the process block transfers information between the plurality of sub-blocks and a corresponding one of the plurality of main blocks.

5. The PLC control device of claim 4, wherein the process block receives status information of the sub-modules from the plurality of sub-blocks and transmits the status information to a corresponding main block, and
wherein the process block receives a driving signal from the corresponding main block and transmits the driving signal to the plurality of sub-blocks.

6. The PLC control device of claim 5, wherein the plurality of sub-blocks issues a driving command to a corresponding sub-module based on the driving signal received from the process block.

7. The PLC control device of claim 1, wherein each of the plurality of sub-blocks includes at least one driving block, and
wherein the at least one driving block controls a driving unit of a corresponding sub-block.

8. The PLC control device of claim 7, wherein the at least one driving block includes:
a second driving command unit, which issues a driving command to the driving unit of the sub-block; and
a second state management unit, which manages a status of the driving unit.

9. The PLC control device of claim 8, wherein each of the plurality of sub-blocks includes a first variable management structure, which stores status information of the at least one driving block; and
wherein the process block includes a second variable management structure, which stores driving information of the at least one driving block.

10. A programmable logic controller (PLC) control method for controlling equipment in an automated facility using a PLC logic controller, the method comprising:
generating a first main block from among a plurality of main blocks, each of which including a plurality of sub-blocks and a process block;
generating first sub-blocks corresponding to the first main block, each of which controls a corresponding one of a plurality of sub-modules, wherein each of the plurality of sub-blocks includes:
an interlock management unit, which checks an operating condition of a sub-module;
a first state management unit, which manages a status of the sub-module; and
a first driving command unit, which selectively issues a drive command to the sub-module based on a state of the interlock management unit; and
transferring information between the first sub-blocks and the first main block, and generating a first process block for managing operation steps of the first main block; and
controlling the automated facility by controlling equipment in the automated facility, wherein each of the plurality of main blocks is associated with a separate piece of equipment in the automated facility.

11. The method of claim 10, wherein the first main block controls a corresponding first upper module among a plurality of upper modules in the automated facility, and wherein each of the first sub-blocks controls a first sub-module corresponding to the first upper module among the plurality of sub upper modules.

12. The method of claim 11, further comprising:
generating a first driving block, which allows each of the first sub-blocks to issue a driving command to the corresponding first sub-module.

13. The method of claim 12, wherein the generating of the first process block includes receiving, by the first process block, status information of the first sub-module from the first sub-blocks and transmitting the status information to the first main block, and receiving, by the first process block, a driving signal from the first main block and transferring the driving signal to the first sub-blocks.

14. The method of claim 13, wherein the generating of the first driving block further includes issuing the driving command to the first sub-module based on the driving signal received from the first process block by the first sub-blocks.

15. The method of claim 12, wherein the first sub-module includes a driving unit, and
wherein the generating of the first driving block includes:
managing a status of the driving unit, by the first driving block, and issuing the driving command directly to the driving unit.

16. The method of claim 13, wherein the generating of the first sub-blocks includes: an interlock management operation including managing, by the first sub-blocks, a status of the first sub-module and checking an operating condition of the first sub-module when the driving signal is received from the first process block.

17. The method of claim 12, wherein the generating of the first sub-blocks includes: storing status information of the first sub-module, by the first sub-blocks, in a first variable management structure.

18. The method of claim 17, wherein the generating of the first process block includes: storing driving information of the first sub-module, by the first process block, in a second variable management structure and sharing the driving information with the first variable management structure.

19. The method of claim 18, wherein the plurality of main blocks further includes a second main block independent of the first main block and which controls a second upper module, and
wherein the first main block and the second main block are defined as global types, and the first main block and the second main block share the status information and the driving information of the driving block with each other, through the first variable management structure and the second variable management structure, respectively.

* * * * *